United States Patent [19]

Perkins et al.

[11] Patent Number: 5,347,694
[45] Date of Patent: Sep. 20, 1994

[54] LOCKING MECHANISMS

[76] Inventors: Richard W. Perkins, 13800 Valerio St., Van Nuys, Calif. 91405; Bradley I. Read, Los Angeles, Calif. 90065

[21] Appl. No.: 33,842

[22] Filed: Mar. 19, 1993

Related U.S. Application Data

[63] Continuation of Ser. No. 724,877, Jul. 2, 1991, abandoned.

[51] Int. Cl.$^5$ ............................................. A44B 11/25
[52] U.S. Cl. ..................................... 24/632; 24/635
[58] Field of Search ............................ 24/633–636, 24/630–632, 603, 640, 697.1; 410/77, 78, 80

[56] References Cited

U.S. PATENT DOCUMENTS

| | | | |
|---|---|---|---|
| 737,068 | 8/1903 | Briel et al. ................... | 24/635 X |
| 1,083,416 | 1/1914 | Sorensen et al. .............. | 24/635 |
| 1,444,574 | 2/1923 | Walter ........................ | 24/635 |
| 4,391,543 | 7/1983 | Elsing . | |

*Primary Examiner*—James R. Brittain
*Attorney, Agent, or Firm*—Blakely, Sokoloff, Taylor & Zafman

[57] ABSTRACT

A fastener that has an anchor that can be inserted into and locked within a female cage. The female cage includes at least two flexible spring members that each have a first portion and a second portion that is at an angle to the first portion. The cage also has a collar that extends around the first portions of the flexible members. The springs are adapted to move relative to the collar between first and second positions. When the springs are in the first position, the second portions are separated into an open position. Movement of the springs into the second position forces the second portions of the springs to move into a closed position. The second sides are constructed so that there is an aperture between the springs when the second portions are in the closed position. The anchor has a conical shaped barb with an apex and a base portion. The base portion of the barb is slightly larger than the aperture between the springs. When the female cage is in the closed position, the anchor can be pushed through the aperture. Once inserted, the stiffness of the second portions prevent the barb from being pulled back out of the cage. Detachment occurs when the springs are moved back into the first position and the second portions open up into the open position, whereby the barb can be removed from the cage. The flexible springs are attached to a gear that rotates and moves the springs between the first and second positions.

47 Claims, 3 Drawing Sheets

LOCKING MECHANISMS

This is a continuation of application Ser. No. 07/724,877, filed Jul. 2, 1991, now abandoned.

BACKGROUND OF THE INVENTION

1. Field of the Invention

The present invention relates to fasteners.

2. Description of Related Art

Many common fasteners require a certain amount of force to engage and detach the joining members. For instance, "snap on" buttons must be pushed together and pulled apart, screws must be rotated in and out, and zippers must be pulled up and down to actuate the same. None of these fasteners are conducive to rapid engagement or detachment of the joining members. The introduction of hook and loop material, sold under the trademark "VELCRO", alleviated this problem by allowing two joining members to be easily and quickly fastened together and pulled apart. Unfortunately, VELCRO has a somewhat limited pull strength. Such material is typically used for garments which have low pull loads and cannot be used to attach heavy objects such as cargo containers. It would therefore be desirable to have a fastener that can be readily fastened and detached, and has the pull strength for heavy industrial uses.

Additionally, most fasteners are not constructed or adapted so that a plurality of fasteners can be simultaneously engaged and detached. Such an arrangement can be highly desirable for certain applications. For example, a rectangular cargo container may be attached to another container at the four corners of the box. Fastening or disconnecting the containers usually requires the individual attachment or detachment of each fastener. Such a procedure results in extended loading or unloading time of the containers. It would therefore be desirable to have a plurality of fasteners that can be simultaneously engaged and detached.

SUMMARY OF THE INVENTION

The present invention is a fastener that has an anchor that can be inserted into and locked within a female cage. The female cage includes at least two flexible spring members that each have a first portion, and a second portion that is at an angle to the first portion. The cage also has a collar that extends around the first portions of the flexible spring members. The springs are adapted to move relative to the collar between a first and second position. When the springs are in the first position, the second portions are separated into an open position. Movement of the springs into the second position forces the second portions of the springs to move into a closed position. The second portions are constructed so that there is created an aperture between the springs when the second portions are in the closed position.

The anchor preferably has a conical shaped barb with an apex and a base portion. The base portion of the barb is slightly larger than the aperture between the springs. When the female cage is in the closed position, the anchor can be pushed through the aperture, with the apex of the barb entering first, followed by the base portion. The spring members are flexible enough so that the second portions bend to allow the base portion of the barb to enter the cage. Once inserted, the stiffness of the second portions prevent the barb from being pulled back out of the cage. Detachment occurs when the springs are moved back into the first position and the second portions open up into the open position, whereby the barb can be removed from the cage.

The flexible springs are attached to a gear that rotates and moves the springs between the first and second positions. The gears mesh with a rack, such that a linear movement of the rack rotates the gear. A plurality of female cages and gears can all be connected to a rack, so that the linear movement of the rack rotates the gears and simultaneously opens or closes the female cages. The cages and gears can be attached to a plurality of racks that are connected to a rack and pinion mechanism, which simultaneously opens and closes rows of female cages.

Therefore it is an object of this invention to provide a fastener with a large pull load, that can be easily engaged and detached.

It is also an object of this invention to provide a plurality of fasteners that can be simultaneously attached and released.

BRIEF DESCRIPTION OF THE DRAWINGS

The objects and advantages of the present invention will become more readily apparent to those skilled in the art after reviewing the following detailed description and accompanying drawings, wherein.

DETAILED DESCRIPTION OF THE INVENTION

Figure 1:
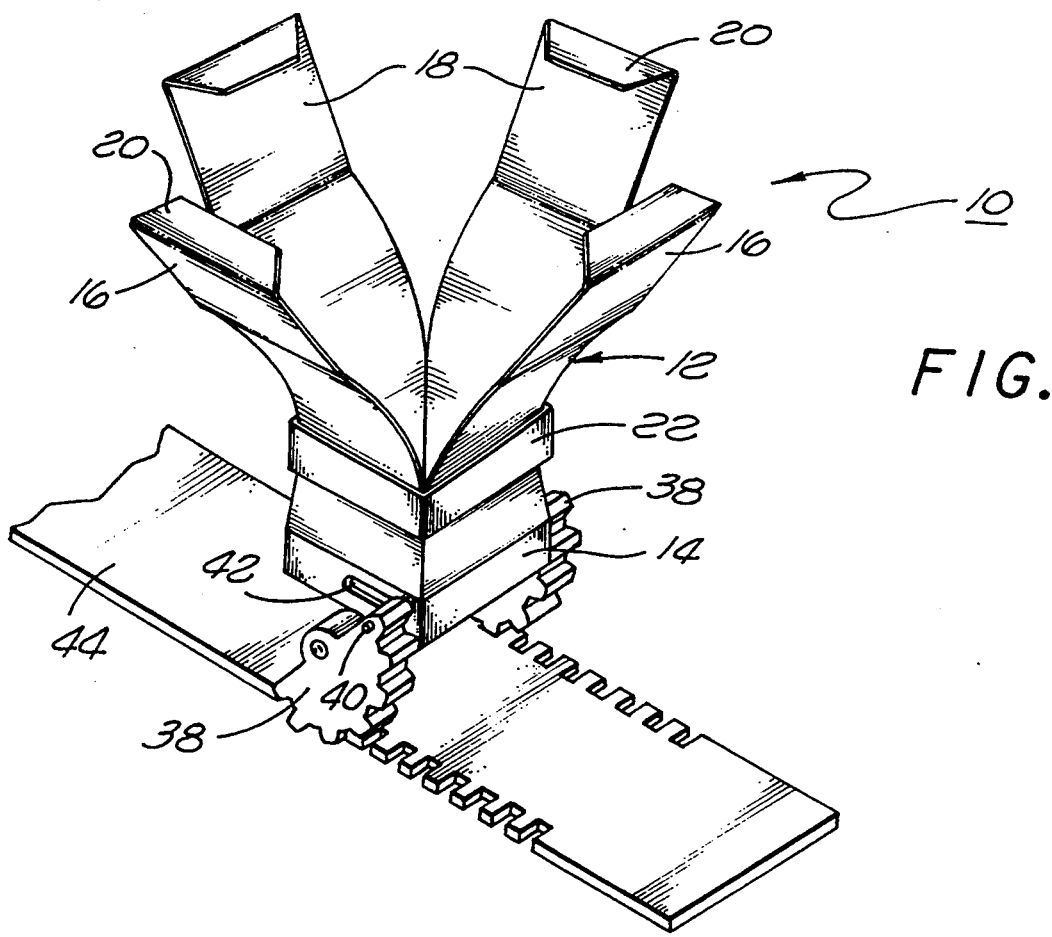
FIG. 1 is a perspective view of a female cage of a fastener of the present invention, wherein the female cage is in an open position.

Referring to the drawings more particularly by reference numbers, FIG. 1 shows a female part 10 of a fastener of the present invention. The female part 10 includes a female cage 12 that has a base portion 14 with flexible spring members 16 that extend from the base 14. Although the cage 12 shown has four springs in a rectangular shape, it is to be understood that the cage 12 may have two or more springs 16 and be configured into any shape, depending upon the size and application of the fastener. The flexible members 16 each have a first portion 18 and a second portion 20 that extends at an angle from the first portion 18. The members 16 are built to be flexible, so that the members 16 can cantilever about the base portion 14. The springs 16 can be constructed out of material such as steel, copper or plastic. Metals are preferred for applications with high pull loads, while plastics are preferable for high volume low cost uses. The flexible spring members 16 can be cut from a single sheet and attached to the base portion 14. In the alternative, the cage 12 may be assembled from separate pieces of flexible springs that are welded or attached by other means to the base portion 14.

Figure 2:
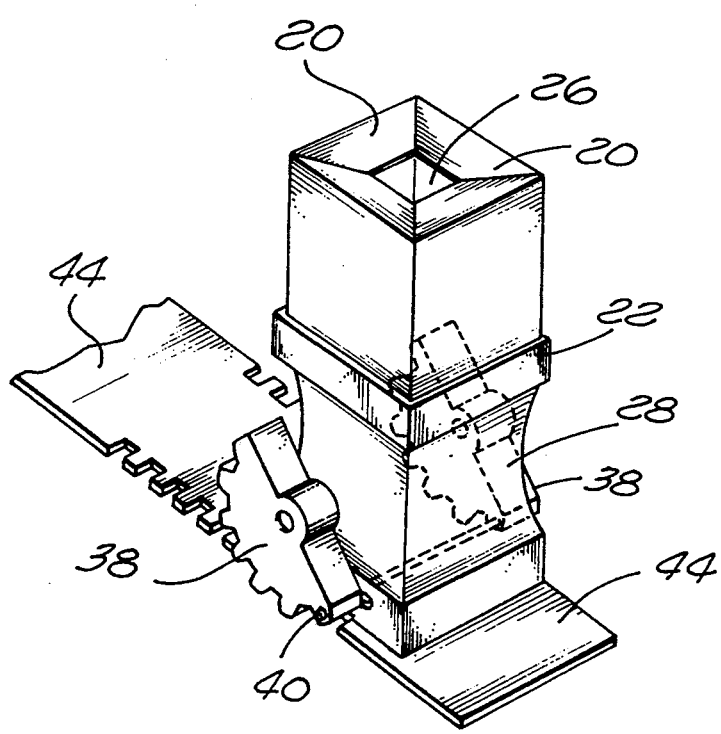
FIG. 2 is a perspective view similar to FIG. 1 showing the female cage in a closed position.

A collar 22 extends around the first portions 18 to contain the springs 16. The collar 22 is not attached to the springs 16, so that the collar 22 and springs 16 can move relative to each other. When the collar 22 and springs 16 are in a first relative position, the second portions 20 of the springs 16 are separated in an open position, as shown in FIG. 1. As shown in FIG. 2, when the collar 22 and springs 16 are in a second position relative to each other the second portions 20 are in an adjacent closed position. The combined area of the second portions 20 is less than the area of the base portion 14, so that there is an aperture 26 between the second portions 20. The springs 16 are normally biased into the open position. The linear movement of the springs 16 and collar 22 into the second position forces the springs 16 into the closed position, and the linear movement of the collar 22 and springs 16 into the first position allows the second portions 20 to move back into the open position. In the preferred embodiment, the springs 16 have a radial base portions 28 that bend the second portions 20 into the open position. The radial base portion 28 also allows the springs 16 to bend outward when the springs 16 are moving into the first position.

Figure 3:
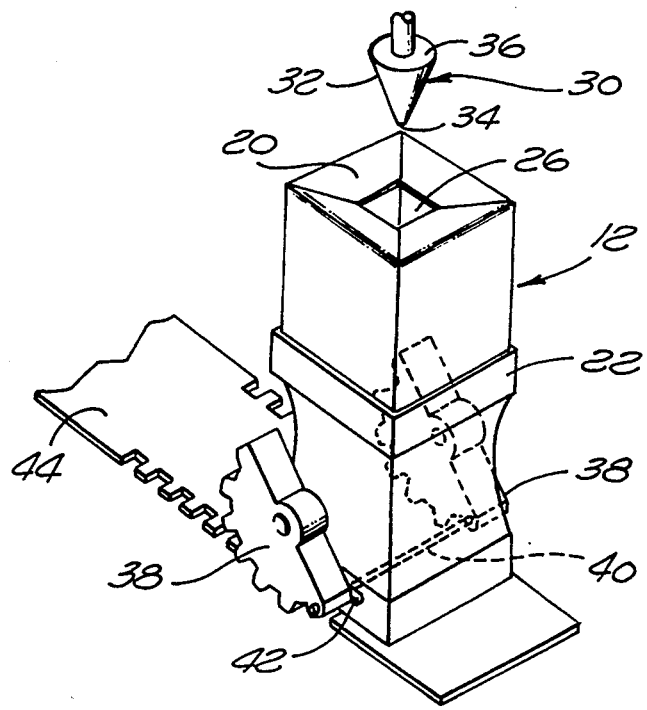
FIG. 3 is a perspective view similar to FIG. 2, showing a male anchor that can be inserted into the female cage shown in FIG. 2.

FIG. 3 shows an anchor 30 that can be attached to the cage 12. The anchor 30 is typically attached to a first member and the cage 12 is attached to a second member, so that the insertion of the anchor 30 into the cage 12 fastens the two members together. In the preferred embodiment, the anchor 30 has a conical shaped barb 32 that has an apex 34 and a base portion 36. The base portion 36 is slightly larger than the aperture 26 of the cage 12. To attach the anchor 30 and cage 12, the barb 32 is inserted through the aperture 26 with the apex 34 first, as indicated by FIG. 3. The second portions 20 of the springs 16 are flexible enough, so that the tapered barb 32 bends the second portions 20 to allow the base portion 36 of the barb 32 to enter the cage 12. Once the base portion 36 of the barb 32 is through the aperture 26, the second portions 20 prevent the barb 32 from coming out of the cage 12. In the preferred embodiment, the second portions 20 of the springs 16 are at an oblique downward angle with respect to the first portions 18. This angular relationship allows the barb 32 to easily bend and enter the cage 12, while providing added stiffness in the second portions 20 when the base portion 36 has passed through the aperture 26. Once the barb 32 is within the second opening 26, the anchor 30 cannot be removed from the cage 12 until the springs 16 and collar 22 are moved into the first position. As shown in FIG. 1, movement of the springs 16 into the first position opens up the second portions 20 so that the barb 32 can be removed from the cage 12. As an alternative method of engaging the anchor 30 with the cage 12, the springs 16 can be moved into the open position to allow the anchor 30 to be inserted into the cage 12. The springs 16 can then be moved into the closed position, thereby securing the anchor 30 to the female part 10.

A first gear 38 is attached to the cage 12, such that rotation of the first gear 38 moves the springs 16 and collar 22 between the first and second positions. In the preferred embodiment, there are two first gears 38 that are connected to the base portion 14 of the cage 12 by a pin 40 that extends through slots 42 in the base 14. When the gears 38 are in a first angular position, the springs 16 are in the first position as shown in FIG. 1.

When the gears 38 are rotated into a second angular position, the springs 16 are moved into the second position as shown in FIG. 2. The collar 22 is stationary, so that the angular movement of the pin 40 moves the base portion 14 and attached springs 16 in a linear direction between the first and second positions. Because the collar 22 is stationary, the slots 42 are needed to allow the pin 40 to move in a lateral direction as pin 40 is moving around the circumference of a circle. Although the first gears 38 are shown attached to the base portion 14 of springs 16, it is to be understood that the first gears 38 could be attached to the collar 22 and the springs 16 could be kept stationary, wherein the collar 22 would move between the first and second positions.

The teeth of the first gears 38 preferably mesh with the teeth of a first rack 44. The linear movement of the first rack 44 causes the first gears 38 to rotate in a rack and pinion manner. When the first rack 44 is in a first linear position as shown in FIG. 1, the first gears 38 are in the first angular position. When the first rack 44 is in a second linear position as shown in FIG. 2, the first gears 38 are in the second angular position.

To engage the fastener, the first rack 44 is moved into the second position, which rotates the first gears 38 and moves the springs 16 into the closed position. The barb 32 can then be inserted through the aperture 26, thereby attaching the anchor 30 to the cage 12. The anchor 30 can be detached by simply moving the first rack 44 into the first position, which rotates the first gears 38 and moves the springs 16 into the open position, allowing the barb 32 to be removed from the cage 12. Although a first rack 44 is described and shown, it is to be understood that other means can be incorporated to rotate the first gears 38. For example, the first gears 38 may be attached to a hydraulic rotary actuator, or an electric motor that will rotate the first gears 38 between the first and second angular positions. Such a system would be desirable for heavy industrial applications, or systems where the fasteners would have to be remotely disengaged. The first rack 44 shown would be particularly useful when the fastener is attached to a garment, wherein the first rack 44 could be constructed from a molded plastic.

Figure 4:
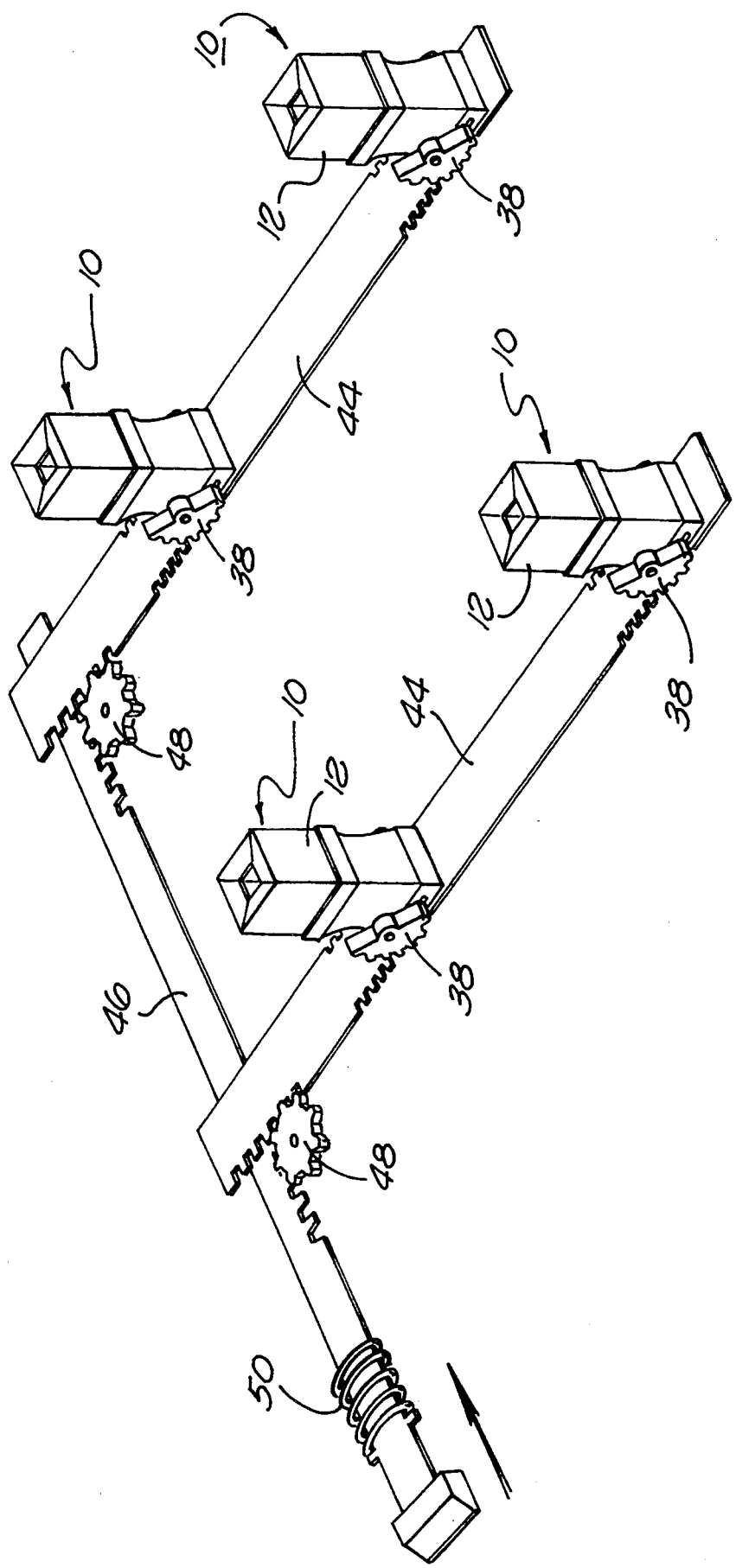
FIG. 4 is a perspective view of a fastener with a plurality of female cage connected to a rack and pinion assembly that can simultaneously open and close the female cage.

FIG. 4 shows a particular application of the fastener incorporating a plurality of female portions 10. In this embodiment, two first racks 44 are each coupled to a pair of female cages 12, such that the movement of one rack 44 simultaneously rotates the first gears 38 of the connected female portions 10. The first racks 44 can be coupled to a second rack 46 by a pair of second gears 48. A linear movement of the second rack 46 rotates the second gears 48, which moves the first racks 44 in a linear manner. The second rack 46 can move the first racks 44 between the first and second linear position to open and close the female cages 12. A spring 50 can be attached to the second rack 46 to bias the first racks 44 into the second linear position, so that the cages 12 are normally in the closed position. To open the cages 12 the second rack 46 can be pushed in the direction indicated by the arrow, which rotates the second gears 48 and moves the first racks 44 into the first linear position. Such an arrangement allows the user to simultaneously disengage a plurality of fasteners, which can be spaced over great distances. As discussed above, a hydraulic or electric system can be used in lieu of the racks, wherein the first gears 38 can be rotated and the cages 12 can be open or closed with the push of a button.

Figure 5:
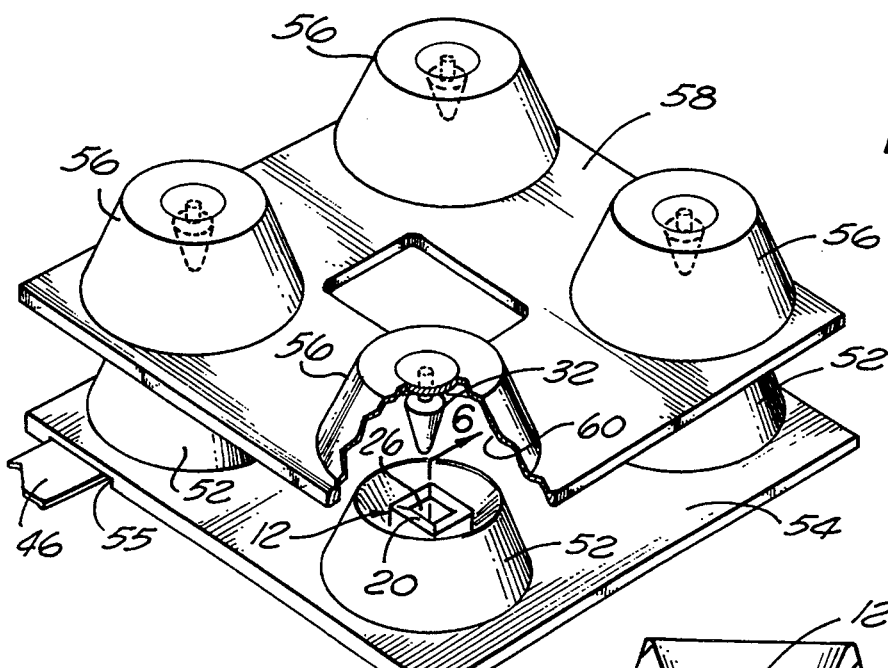
FIG. 5 is perspective view of an alternate embodiment of the fastener of FIG. 4 with housings around the cages and anchors that align the two members.

FIG. 5 shows a preferred embodiment of the fastener of FIG. 4, wherein the cages 12 are protected by male housings 52, that can be joined together by a first plate 54 which covers the racks. The first plate 54 preferably has a recessed portion 55 that provides access to the second rack 46. The barbs 32 are each attached to a female housing 56 that can be joined together by a second plate 58. The female housings 56 have an inner cavity 60 that match the outer profile of the male housings 52. The conical shape of the housings 52 and 56, lead in and align the barbs 32 with the aperture 26, so that the anchors 30 and cages 12 can be fastened together in a blind fashion. Although conical shaped housings are shown, it is to be understood that other aligning features may be incorporated.

Figure 6:
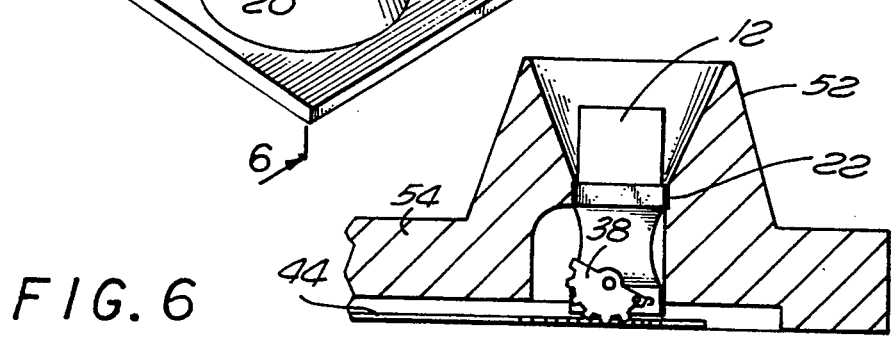
FIG. 6 is a cross sectional side view taken at line 6—6 of FIG. 5.

As shown in FIG. 6, the collar 22 can actually be part of the male housing 52, wherein the springs 12 move relative to the housing 52. The gears and racks are also covered by the housings 52 and first plate 54 to protect those components from the environment. This embodiment thus provides a module that incorporates a plurality of attaching anchors and cages. Such an embodiment is particularly useful when the fastener is used to attach two pieces of garment material. When used with a garment, a substantial number of small cages, on the order of a tenth of an inch, can be combined to provide a fastener that is similar to the hook and loop material sold under the trademark "VELCRO", wherein the fastener of the present invention would have a substantially greater pull load.

While certain exemplary embodiments have been shown and described in the above description and accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A fastener, comprising:
   at least two flexible spring members each having a first portion and a second portion extending at an angle from said first portion, said flexible spring members being constructed such that said second portions are biased into an open position, said second portions being constructed such that when said second portions are adjacent and in a closed position said second portions define an aperture;
   a collar that contains said flexible spring members, said collar being adapted such that said flexible spring members and said collar can move relative to each other between a first position and a second position, wherein said second portions are in said open position when said collar and said flexible spring members are in said first position and said second portions are in said closed position when said collar and said flexible spring members are in said second position;
   a gear assembly that induces movement between said collar and said flexible spring members such that said collar an said flexible spring members move between said first position and said second position; and,
   an anchor adapted to be inserted through said aperture of said flexible spring members, said anchor having a locking portion that operatively engages said flexible spring members to prevent said anchor from being pulled through said aperture after said anchor has been inserted through said aperture, said anchor being releasable from said flexible spring members when said collar and said flexible spring members are in said first position and said second portions are in said open position.

2. The fastener as recited in claim 1, further comprising alignment means operatively connected to said flexible spring members and said anchor for aligning said anchor with said aperture of said second portions.

3. The fastener as recited in claim 2, wherein said alignment means include a first housing operatively connected to said flexible spring members and a second housing operatively connected to said anchor, said first housing having a first profile and said second housing having a second profile that matches said first profile such that said second housing can be aligned with and coupled to said first housing.

4. The fastener as recited in claim 3, wherein said first profile of said first housing is a conical shaped disk and said second profile of said second housing is a conical shaped cup.

5. The fastener as recited in claim 1, wherein said anchor has a cone shaped barb with an apex and a base portion that is larger than said aperture, wherein said barb is inserted through said aperture by first passing said apex and then said base portion of said barb through said aperture, said second portions being flexible enough to allow said base portion to be inserted through said aperture and rigid enough to prevent said base portion from passing back through said aperture after said barb has been inserted.

6. The fastener as recited in claim 1, wherein said movement means includes a rack operatively connected to a gear of said gear assembly, such that said rack moves between a first linear position and a second linear position rotating said gear between a first angular position and a second angular position, said gear being operatively connected to said collar and said flexible spring members such that rotation of said gear between said first and second angular positions induces movement between said collar and said flexible spring members such that said collar and said flexible spring members are between said first and second positions.

7. The fastener as recited in claim 6, wherein there are two gears operatively connected to said rack, said collar and said flexible spring members.

8. The fastener as recited in claim 1, wherein said flexible spring members have a radial base portion that biases said second portions into said open position.

9. The fastener as recited in claim 1, wherein there are four flexible spring members constructed to define a rectangular box when said second portions are in said closed position.

10. The fastener as recited in claim 1, wherein said flexible spring members are constructed from steel.

11. The fastener as recited in claim 1, wherein said flexible spring members are constructed from plastic.

12. A fastener that can attach a first member to a second member, comprising:
   at least two flexible spring members operatively connected to the first member, each flexible spring member having a first portion and a second portion extending at an angle oblique to said first portion, said flexible spring members being constructed such that said second portions are biased into an open position, said second portions being constructed such that when said second portions are adjacent and in a closed position said second portions define an aperture;

a collar that contains said flexible spring members, said collar being adapted such that said flexible spring members and said collar can move relative to each other between a first position and a second position, wherein said second portions are in said open position position when said collar and said flexible spring members are in said first position and said second portions are in said closed position when said collar and said flexible spring members are in said second position;

at least one gear operatively connected to said collar and said flexible spring members, said gear being rotatable between a first angular position and a second angular position, wherein said collar and said flexible spring members are in said first position when said gear is in said first angular position and said collar and said flexible spring members are in said second position when said gear is in said second angular position;

a rack operatively connected to said gear to rotate said gear between said first and second angular positions;

an anchor attached to the second member and adapted to be inserted through said aperture of said flexible spring members, said anchor having a cone shaped barb with an apex and a base portion that is larger than said aperture, wherein said barb can be inserted through said aperture by first passing said apex and then said base portion of said barb through said aperture, said second portions being flexible enough to allow said base portion to be inserted through said aperture and rigid enough to prevent said base portion from being pulled back through said aperture after said barb has been inserted, said anchor being releasable from said flexible spring members when said collar and said flexible spring member are in said first position and said second portions are in said open position; and, alignment means operatively connected to said flexible spring members and said anchor to align said barb with said aperture.

13. The fastener as recited in claim 12, wherein said alignment means include a first housing operatively connected to said flexible spring members and a second housing operatively connected to said anchor, said first housing having a first profile and said second housing having a second profile that matches said first profile such that said second housing can be align with and coupled to said first housing.

14. The fastener as recited in claim 13, wherein said first profile of said first housing is a conical shaped disk and said second profile of said second housing is a conical shaped cup.

15. A fastener, comprising:

at least two flexible spring members each having a first portion and a second portion extending at an angle to said first portion, said flexible spring members being constructed such that said second portions are biased into an open position, said second portions being constructed such that when said second portions are adjacent and in a closed position said second portions define an aperture;

a collar that extends around said first portions of said flexible spring members, said collar being adapted such that said flexible spring members can move relative to said collar between a first position and a second position, wherein said second portions are in said open position when said flexible spring members are in said first position and said second portions are in said closed position when said flexible spring members are in said second position;

a gear assembly that moves said flexible spring members between said first and second positions; and, an anchor adapted to be inserted through said aperture of said flexible spring members, said anchor having a locking portion that operatively engages said flexible spring members to prevent said anchor from being pulled through said aperture after said anchor has been inserted through said aperture, said anchor being releasable from said flexible spring members when said flexible spring members are in said first position and said second portions are in said open position.

16. The fastener as recited in claim 15, further comprising alignment means operatively connected to said flexible spring members and said anchor for aligning said anchor with said aperture of said second portions.

17. The fastener as recited in claim 16, wherein said alignment means include a first housing operatively connected to said flexible spring members and a second housing operatively connected to said anchor, said first housing having a first profile and said second housing having a second profile that matches said first profile such that said second housing can be align with and coupled to said first housing.

18. The fastener as recited in claim 17, wherein said first profile of said first housing is a conical shaped disk and said second profile of said second housing is a conical shaped cup.

19. The fastener as recited in claim 15, wherein said anchor has a cone shaped barb with an apex and a base portion that is larger than said aperture, wherein said barb is inserted through said aperture by first passing said apex and then said base portion of said barb through said aperture, said second portions being flexible enough to allow said base portion to be inserted through said aperture and rigid enough to prevent said base portion from passing back through said aperture after said barb is inserted.

20. The fastener as recited in claim 15, wherein said movement means includes a rack operatively connected to a gear of said gear assembly, such that said rack moves between a first linear position and a second linear position rotating said gear between a first angular position and a second angular position, said gear being operatively connected to said flexible spring members such that rotation of said gear between said first and second angular positions moves said flexible spring members between said first and second positions.

21. The fastener as recited in claim 20, wherein there are two gears operatively connected to said rack and said flexible spring members.

22. The fastener as recited in claim 21, wherein said flexible spring members have a radial base portion that biases said second portions into said open position.

23. The fastener as recited in claim 22, wherein there are four flexible spring members constructed to define a rectangular box when said second portions are in said closed position.

24. The fastener as recited in claim 15, wherein said flexible spring members are constructed from steel.

25. The fastener as recited in claim 15, wherein said flexible spring members are constructed from plastic.

26. A fastener that can attach a first member to a second member, comprising:

at least two flexible spring members operatively connected to the first member, each said flexible spring member having a first portion and a second portion extending at an angle oblique to said first portion, said flexible spring members being constructed such that said second portions are biased into an open position, said second portions being constructed such that when said second portions are adjacent and in a closed position said second portions define an aperture;

a collar that extends around said first portions of said flexible spring members, said collar being adapted such that said flexible spring members can move relative to said collar between a first position and a second position, wherein said second portions are in said open position when said flexible spring members are in said first position and said second portions are in said closed position when said flexible spring members in said second position;

at least one gear operatively connected to said flexible spring members, said gear being rotatable between a first angular position and a second angular position, wherein said flexible spring members are in said first position when said gear is in said first angular position and said flexible spring members are in said second position when said gear is in said second angular position;

a rack operatively connected to said gear to rotate said gear between said first and second angular positions;

an anchor attached to the second member and adapted to be inserted through said aperture of said flexible spring members, said anchor having a cone shaped barb with an apex and a base portion that is larger than said aperture, wherein said barb can be inserted through said aperture by first passing said apex and then said base portion of said barb through said aperture, said second portions being flexible enough to allow said base portion to be inserted through said aperture and rigid enough to prevent said base portion from passing back through said aperture after said barb has been inserted, said anchor being releasable from said flexible spring members when said flexible spring members are in said first position and said second portions are in said open position; and, alignment means operatively connected to said flexible spring members and said anchor to align said barb with said aperture.

27. The fastener as recited in claim 26, wherein said alignment means include a first housing operatively connected to said flexible spring members and a second housing operatively connected to said anchor, said first housing having a first profile and said second housing having a second profile that matches said first profile such that said second housing can be align with and coupled to said first housing.

28. The fastener as recited in claim 27, wherein said first profile of said first housing is a conical shaped disk and said second profile of said second housing is a conical shaped cup.

29. The fastener as recited in claim 28, wherein said flexible spring members each have a radial base portion constructed such that said second sides are biased toward said open position.

30. The fastener as recited in claim 29, wherein there are four flexible spring members constructed to define a rectangular box when said second portions are in said closed position.

31. A fastener system, comprising:

at least two female cages that each include;
at least two flexible spring members, each having a first portion and a second portion extending at an angle from said first portion, said flexible spring members being constructed such that said second portions are biased into an open position, said second portions being constructed such that when said second portions are adjacent and in a closed position said second portions define an aperture;

a collar that contains said flexible spring members, said collar being adapted such that said flexible spring members and said collar can move relative to each other between a first position and a second position, wherein said second portions are in said open position when said collar and said flexible spring members are in said first position and said second portions are in said closed position when said collar and said flexible spring members are in said second position;

a gear assembly that induces movement between said collars and said flexible spring members such that said collar and said flexible spring members of each female cage move simultaneously between said first and second positions; and, at least two anchors each adapted to be inserted through a corresponding aperture, each said anchor having a locking portion that operatively engages said flexible spring members to prevent said anchors from passing through said aperture after said anchor has been inserted through said aperture, said anchors being releasable from said flexible spring members when said collars and said flexible spring members are in said first position and said second portions are in said open position.

32. The fastener as recited in claim 31, wherein said gear assembly includes a first rack operatively connected to at least two first gears such that said first rack can move between a first linear position and a second linear position rotating said first gears between a first angular position and a second angular position, said first gears being operatively connected to said collars and said flexible spring members of said female cages such that said rotation of said first gears between said first and second angular positions induces movement between said collars and said flexible spring members such that said collars and said flexible spring members are between said first and second positions.

33. The fastener as recited in claim 31, wherein said gear assembly includes at least two first racks each operatively connected to at least one first gear such that each said first racks can move between a first linear position and a second linear position rotating said first gears between a first angular position and a second angular position, said first gears being operatively connected to said collars and flexible spring members of each said female cage such that said rotation of said first gears between said first and second angular position induces movement between said collars and said flexible spring members such that said collars and said flexible spring members are between said first and second positions, said first racks being operatively connected to actuation means that simultaneously move said first racks between said first and second linear positions.

34. The fastener as recited in claim 33, wherein said actuation means includes at least two second gears each operatively connected to said first racks such that rotation of said second gears causes linear movement of said first racks, and a second rack operatively connected to said second gears such that linear movement of said second rack causes rotation of said second gears, said second rack being adapted to move between a first linear actuation position and a second linear actuation position, which simultaneously rotates said second gears and said first racks between said first and second linear positions.

35. The fastener as recited in claim 31, wherein said gear assembly includes at least two first gears that are operatively connected to said collar and said flexible spring members of said female cages, said first gears being adapted to move between a first angular position and a second angular position, such that said collars and said flexible spring members are in said first positions when said first gears are in said first angular position and said collars and said flexible spring members are in said second position when said first gears are in said second angular position, said first gears each being operatively connected to a hydraulic system that simultaneously rotates said first gears between said first and second angular positions.

36. The fastener as recited in claim 31, wherein said gear assembly includes at least two first gears that are operatively connected to said collar and said flexible spring members of said female cages, said first gears being adapted to move between a first angular position and a second angular position such that said collars and said flexible spring members are in said first position when said first gears are in said first angular position and said collars and said flexible spring members are in said second position when said first gears are in said second angular position, said first gears each being operatively connected to an electrical system that simultaneously rotates said first gears between said first and second angular positions.

37. A fastener system, comprising:
at least two female cages that each include;
at least two flexible spring members each having a first portion and a second portion extending at an angle oblique to said first portion, said flexible spring members being constructed such that said second portions are biased into an open position, said second portions being constructed such that when said second portions are adjacent and in a closed position said second portions define an aperture;
a collar that extends around said first portions of said flexible spring members, said collar being adapted such that said flexible spring members can move between a first position and a second position, wherein said second portions are in said open position when said flexible spring members are in said first position and said second portions are in said closed position when said flexible spring members are in said second position;
a gear assembly that simultaneously moves said flexible spring members of each said female cage between said first and second positions;
at least two anchors each adapted to be inserted through a corresponding aperture, said anchors each having a cone shaped barb with an apex and a base portion that is larger than said aperture, wherein said barb can be inserted through said aperture by first passing said apex and then said base portion of said barb through said aperture, said second portions being flexible enough to allow said base portion to be inserted through said aperture and rigid enough to prevent said base portion from passing back through said aperture after said barb has been inserted, said anchors being releasable from said flexible spring members when said flexible spring members are in said first position and said second portions are in said open position; and,
alignment means operatively connected to said flexible spring members and said anchors to align said barbs with said apertures.

38. The fastener as recited in claim 37, wherein said gear assembly includes a first rack operatively connected to at least two first gears such that said first rack can move between a first linear position and a second linear position rotating said first gears between a first angular position and a second angular position, said first gears being operatively connected to said flexible spring members of each said female cage such that said rotation of said first gears between said first and second angular positions moves said flexible spring members between said first and second positions.

39. The fastener as recited in claim 37, wherein said gear assembly includes at least two first racks each operatively connected to at least one first gear such that each said first rack can move between a first linear position and a second linear position rotating said first gears between a first angular position and a second angular position, said first gears being operatively connected to said flexible spring members of each said female cage such that said rotation of said first gears between said first and second angular position moves said flexible spring members between said first and second positions, said first racks being operatively connected to actuation means that simultaneously move said first racks between said first and second linear positions.

40. The fastener as recited in claim 39, wherein said actuation means includes at least two second gears each operatively connected to said first racks such that rotation of said second gears causes linear movement of said first racks, and a second rack operatively connected to said second gears such that linear movement of said second rack causes rotation of said second gears, said second rack being adapted to move between a first linear actuation position and a second linear actuation position, which simultaneously rotates said second gears and said first racks between said first and second linear positions.

41. The fastener as recited in claim 37, wherein said gear assembly includes at least two first gears that are operatively connected to said flexible spring members of said female cages, said first gears being adapted to move between a first angular position and a second angular position, such that said flexible spring members are in said first position when said first gears are in said first angular position and said flexible spring members are in said second position when said first gears are in said second angular position, said first gears each being operatively connected to a hydraulic system that simultaneously rotates said first gears between said first and second angular positions.

42. The fastener as recited in claim 37, wherein said gear assembly includes at least two first gears that are operatively connected to said flexible spring members of said female cages, said first gears being adapted to move between a first angular position and a second angular position such that said flexible spring members are in said first position when said first gears are in said first angular position and said flexible spring members are in said second position when said first gears are in said second angular position, said first gears each being operatively connected to an electrical system that simultaneously rotates said first gears between said first and second angular positions.

43. A method for fastening and detaching a first member with a second member, comprising the steps of:
   providing at least two flexible spring members operatively connected to the first member, flexible spring members having a first portion and a second portion extending at an angle to said first portion, said flexible spring members being constructed such that said second portions are biased into an open position, said second portions being constructed such that when said second portions are adjacent and in a closed position said second portions define an aperture;
   providing a collar that contains said flexible spring members, said collar being adapted such that said flexible spring members and said collar can move relative to each other between a first position and a second position, wherein said second portions are in said open position when said collar and said flexible spring members are in said first position and said second portions are in said closed position when said collar and said flexible spring members are in said second position;
   providing a gear assembly that induces movement between said collar and said flexible spring members such that said collar and said flexible members are between said first position and said second position;
   providing an anchor attached to the second member and adapted to be inserted through said aperture of said flexible spring members, said anchor having a locking portion that operatively engages said flexible spring members to prevent said anchor from being pulled through said aperture after said anchor has been inserted through said aperture, said anchor being releasable from said flexible spring members when said collar and said flexible spring members are in said first position and said second portions are in said open position;
   moving said gear assembly that said collar and said flexible spring members are in said second position and said second portions are in said closed position to create said aperture;
   inserting said anchor through said aperture such that said locking portion of said anchor is engaged with said flexible spring members, wherein the first and second members are fastened together;
   moving said gear assembly such that said collar and said flexible spring members are in said first position and said second portions are in said open position; and,
   removing said anchor such that said locking portion of said anchor is not engaged with said flexible spring members, wherein the first and second members are detached.

44. The method as recited in claim 43, wherein there is further provided alignment means operatively connected to said flexible spring members and said anchor for aligning said anchor with said aperture of said second portions.

45. A method for fastening a first member with a second member, comprising the steps of:
   providing at least two flexible spring members operatively connected to the first member, flexible spring members having a first portion and a second portion extending at an angle to said first portion, said flexible spring members being constructed such that said second portions are biased into an open position, said second portions being constructed such that when said second portions are adjacent and in a closed position said second portions define an aperture;
   providing a collar that contains said flexible spring members, said collar being adapted such that said flexible spring members and said collar can move relative to each other between a first position and a second position, wherein said second portions are in said open position when said collar and said flexible spring members are in said first position and said second portions are in said closed position when said collar and said flexible spring members are in said second position;
   providing a gear assembly that induces movement between said collar and said flexible spring members such that said collar and said flexible members are between said first position and said second position;
   providing an anchor attached to the second member, said anchor having a locking portion that operatively engages said flexible spring members to prevent said anchor from being pulled through said aperture, said anchor being releasable from said flexible spring members when said collar and said flexible spring members are in said first position and said second portions are in said open position;
   moving said gear assembly such that said collar and said flexible spring members are in said first position and said second portions are in said open position;
   placing said anchor between said opened flexible spring members;
   moving said gear assembly such that said collar and said flexible spring members are in said second position and said second portions are in said closed position such that said anchor is engaged with said flexible spring members, wherein the first and second members are fastened together.

46. A method for fastening and detaching a first member with a second member, comprising the steps of:
   providing at least two female cages that each include;
      at least two flexible spring members operatively connected to the first member, each flexible spring members having a first portion and a second portion extending at an angle to said first portion, said flexible spring members being constructed such that said second portions are biased into an open position, said second portions being constructed such that when said second portions are adjacent and in a closed position said second portions define an aperture;
      a collar that contains said flexible spring members, said collar being adapted such that said flexible spring members and said collar can move relative to each other between a first position and a second position, wherein said second portions are in said open position when said collar and said flexible spring members are in said first position and said second portions are in said closed position when said collar and said flexible spring members are in said second position;

providing a gear assembly operatively connected to each female cage that induces movement between said collars and said flexible spring members, such that said collar and said flexible spring members of each said female cage move simultaneously between said first position and said second position;

providing anchors that are attached to the second member and adapted such that each anchor can be inserted through a corresponding aperture, each said anchor having a locking portion that operatively engages said flexible spring members to prevent said anchor from passing through said aperture after said anchor has been inserted through said aperture, said anchor being releasable from said flexible spring members when said collar and said flexible spring members are in said first position and said second portions are in said open position;

moving said gear assembly such that said collar and said flexible spring members are simultaneously placed into said second position and said second portions are in said closed position to create said aperture;

inserting said anchors through said apertures such that said locking portions of said anchors are engaged with said flexible spring members, wherein the first and second members are fastened together;

moving said gear assembly such that said collar and said flexible spring members are simultaneously placed into said first position and said second portions are in said open position; and, removing said anchor such that said locking portion of said anchor is not engaged with said flexible spring members, wherein the first and second members are detached.

47. The method as recited in claim 46, wherein there is further provided alignment means operatively connected to said flexible spring members and said anchor for aligning said anchor with said aperture of said second portions.

* * * * *